United States Patent [19]

Steiner et al.

[11] Patent Number: 5,014,606
[45] Date of Patent: May 14, 1991

[54] WINDSHIELD DEFROSTER SYSTEM FOR THE BELL HELICOPTER TEXTRON, INC., MODEL 206 HELICOPTER AND MILITARY DERIVATIVES

[76] Inventors: Norman F. Steiner; James R. Steiner, both of 7421 Mt. Sherman, Longmont, Colo. 80501

[21] Appl. No.: 124,007

[22] Filed: Nov. 23, 1987

[51] Int. Cl.$^5$ .............................................. B60H 1/00
[52] U.S. Cl. ........................................ 98/2.09; 98/2.08
[58] Field of Search ................... 237/12.3 A, 12.3 B, 237/12.3 R; 98/2.08, 2.09

[56] References Cited

U.S. PATENT DOCUMENTS 3,832,939  9/1974  Kakei et al. ........................... 98/2.09
4,693,172  9/1987  Harvey ................................... 98/2.09

Primary Examiner—Henry A. Bennet

[57] ABSTRACT

A helicopter windshield defogger and/or deicer system is discussed which is connectable with a high pressure, high temperature air supply from the compression stage of a helicopter turbine engine. The system utilizes a coanda ejector type nozzle to mix and distribute high temperature bleed air and aspirated cabin air to a dispersal shroud fixed adjacent to the helicopter windshield.

2 Claims, 3 Drawing Sheets

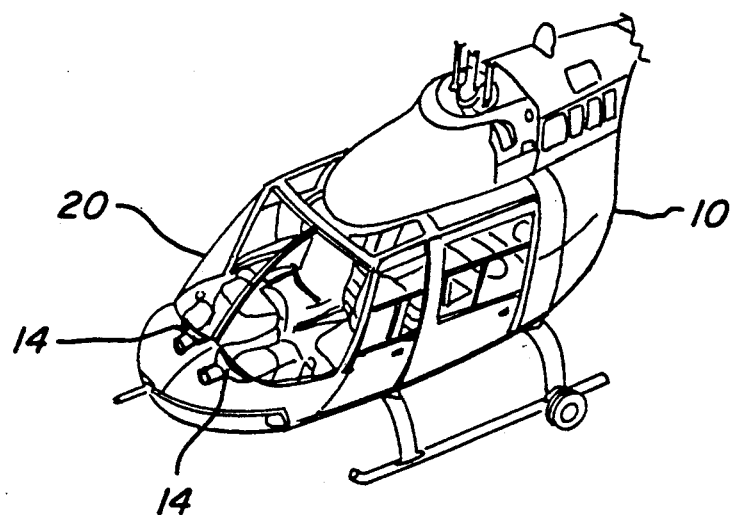
Fig_1A
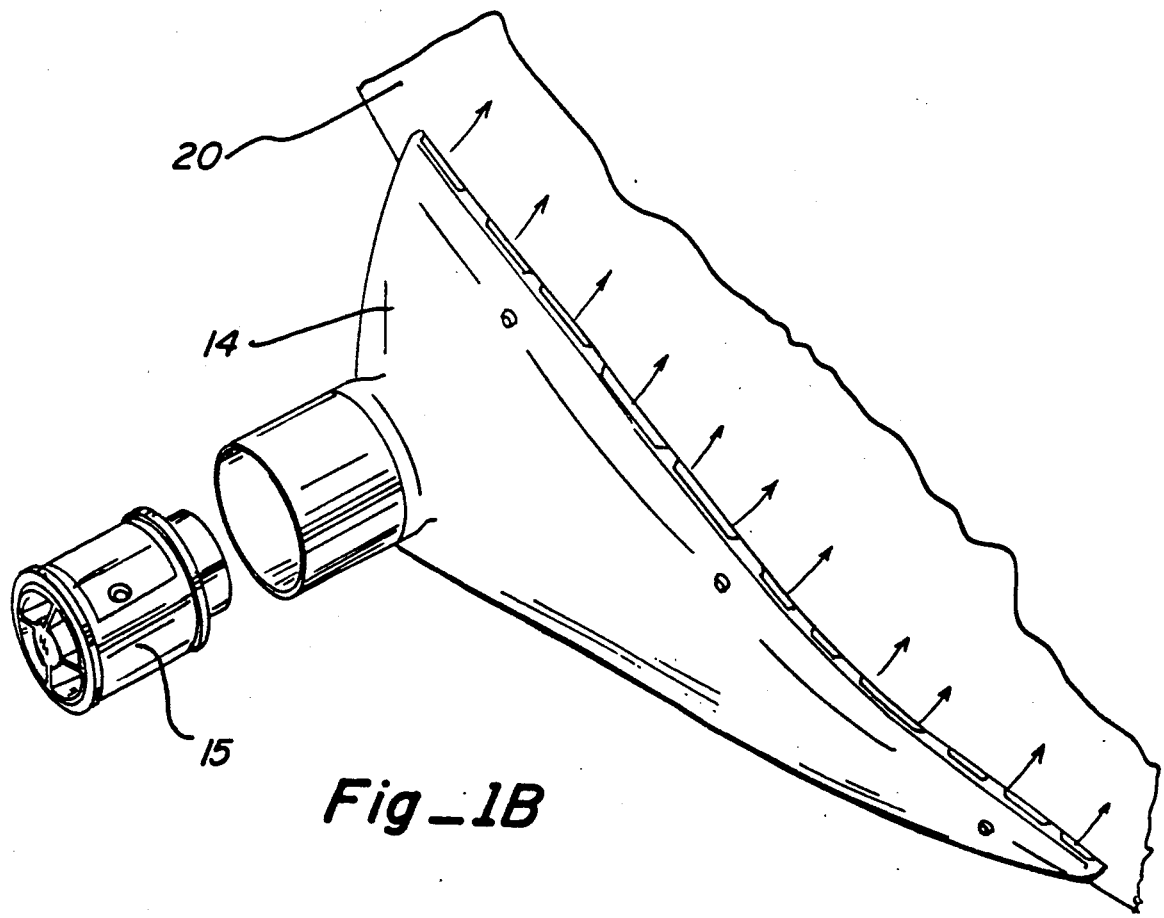
Fig_1B

WINDSHIELD DEFROSTER SYSTEM FOR THE BELL HELICOPTER TEXTRON, INC., MODEL 206 HELICOPTER AND MILITARY DERIVATIVES

FIELD OF THE INVENTION

This invention relates to improvements, in the windshield defroster system for the Bell 206 helicopter, and its military derivatives.

BACKGROUND OF THE INVENTION

The Bell 206 helicopter has been in production since 1963. The windshield defroster system for this helicopter consists of vane axial type blowers connected to polycarbonate air dispersal shrouds.

The function of the blowers is to circulate cabin air across the windshield. There is no direct heat source for this system.

The Bell 206 windshield is particularly difficult to defrost because of its large surface area and because it is located so far forward from the cabin heater outlets. The manufacturer's defroster design is a compromise which is only partially effective.

Experience has shown this defroster system to be ineffective when the cabin air temperature is initially cold, and marginally effective when the cabin air temperature is warm. Furthermore, the circulation blowers are expensive, very noisy, and have limited service life.

Based on a review of the Federal Aviation Administration document "Summary of Supplemental Type Certificates" (any design changes to the helicopter, not incorporated by the manufacturer, must be FAA approved under authority of a supplemental type certificate) and based on common knowledge in the industry there is no engine bleed air type defroster system available for the Bell 206 helicopter.

This invention is intended to be used in conjunction with the existing air dispersal shroud. The blower may be retained or discarded.

SUMMARY OF THE INVENTION

The invention overcomes the above-mentioned problem in prior art windshield defrosting for the Bell 206 helicopter by providing a unique, simple and inexpensive source of heat and airflow on the windshield. The defroster system includes a bleed air tube, an on-off ball valve and a Coanda/ejector airmover. When the ball valve is opened, high pressure, high temperature bleed air is allowed to exhaust through the Coanda-ejector airmover into the defroster air dispersal shroud. Cabin air is thereby pulled into the shroud, mixed with the bleed air, and exhausted over the windshield as warm air to effect the defrosting-defogging of the windshield.

BRIEF DESCRIPTION OF THE DRAWINGS

FIGS. 1A and B are perspective views of the existing Bell 206 defroster system (FIG. 1B is an exploded view);

DESCRIPTION OF THE INVENTION

The Bell Model 206 helicopter 10 shown in FIG. 1, including military derivatives OH-58 and TH-57, is the subject of the defroster system of this invention, the purpose of this invention being to effect defrosting and/or defogging of the helicopter windshield. In this connection the helicopter is provided with existing air dispersal shrouds 14 which are mounted at the base of the windshield 20. Each shroud is equipped with a vane-axial type blower 15.

Figure 2:
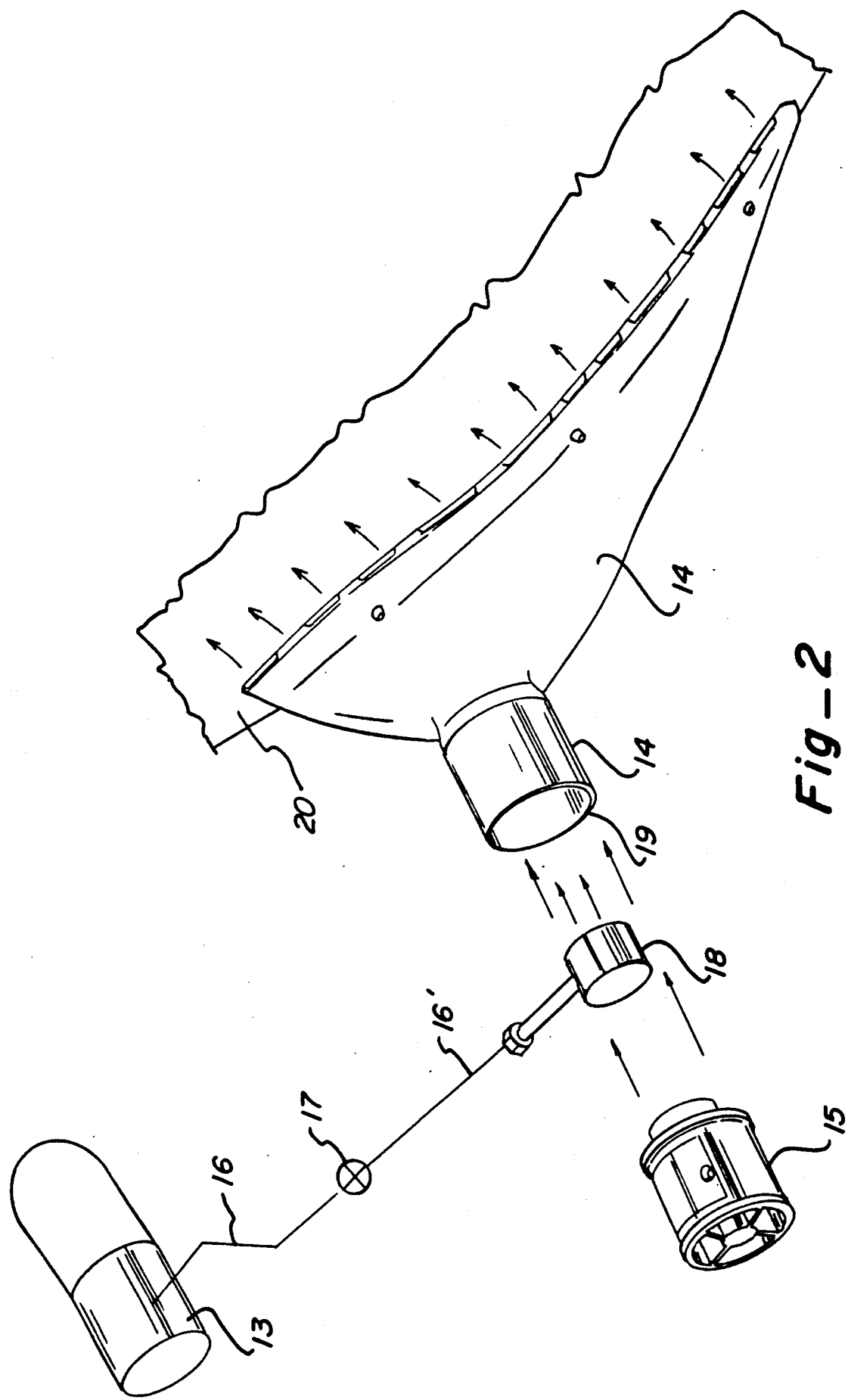
FIG. 2 is a perspective exploded view of the bleed air defroster system in combination with existing blower.
Figure 3:
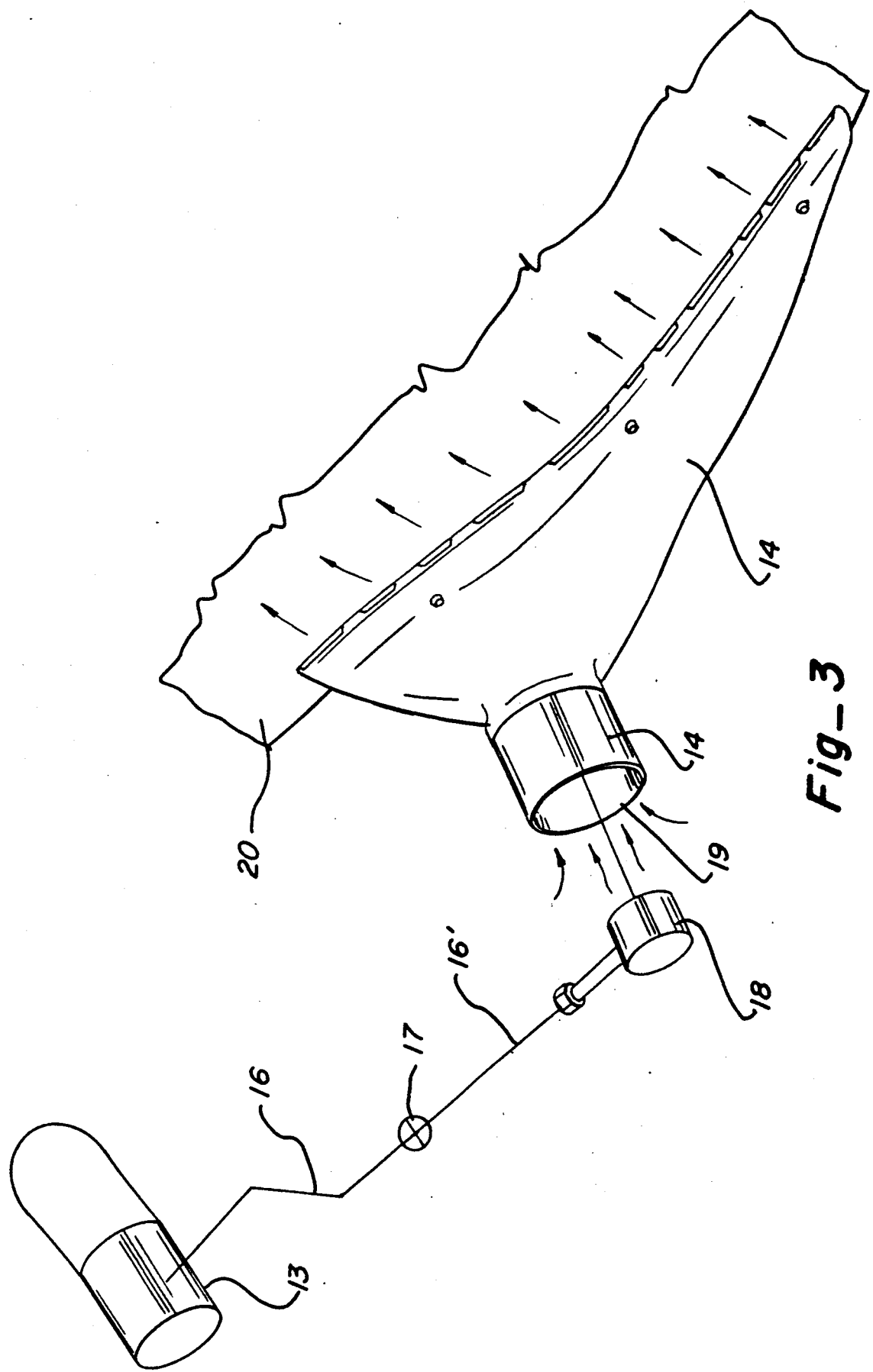
FIG. 3 is a perspective exploded view of the bleed air defroster system with the existing blower deleted.

For use with this invention as shown in FIGS. 2 and 3, high temperature, high pressure air is piped from the compressor stage of the helicopter turbine engine 13 through a metal tube 16. The defroster system is activated by manually opening a valve 17 (for example a ball valve). A Coanda/ejector type airmover 18 is connected with valve 17 by connection line 16' and is positioned in, or in close proximity of, each defroster shroud inlet 19 so as to also pump cabin air into the shroud. The action of the ejector 18 (expelling high pressure, high temperature air into inlet 19) causes the cabin air to be drawn into inlet 19 and mixed with the hot engine bleed air at shroud 14 and to be exhausted from shroud 14 over the windshield.

The defroster blower 15 is not a required part of the invention and may be discarded, or it may be retained to cause further movement of cabin air into inlet 19.

What is claimed:

1. A helicopter windshield defogger and/or de-icer system connectable with a high pressure, high temperature air supply from the compression stage of a helicopter turbine engine, said system comprising a connecting line from said high pressure, high temperature air supply to a Coanda Ejector nozzle positioned adjacent to the helicopter windshield, said Coanda Ejector nozzle having means to distribute a mixture of high temperature air and aspirated cabin air to a position adjacent to the helicopter windshield to promote defrosting and/or de-icing of said windshield.

2. The system of claim 1 further comprising a valve positioned in said connecting line.

* * * * *